(12) United States Patent
Inoue

(10) Patent No.: US 7,175,102 B2
(45) Date of Patent: Feb. 13, 2007

(54) THERMOELEMENT

(75) Inventor: Fujio Inoue, Kiyose (JP)

(73) Assignee: Nippon Thermostat Co., Ltd., Tokyo (JP)

( * ) Notice: Subject to any disclaimer, the term of this patent is extended or adjusted under 35 U.S.C. 154(b) by 215 days.

(21) Appl. No.: 10/499,645

(22) PCT Filed: Sep. 4, 2003

(86) PCT No.: PCT/JP03/11328

§ 371 (c)(1),
(2), (4) Date: Jun. 28, 2004

(87) PCT Pub. No.: WO2004/049351

PCT Pub. Date: Jun. 10, 2004

(65) Prior Publication Data

US 2005/0061893 A1    Mar. 24, 2005

(30) Foreign Application Priority Data

Nov. 27, 2002   (JP)   ............................. 2002-343393

(51) Int. Cl.
*G05D 23/12* (2006.01)
*G05D 23/02* (2006.01)
(52) U.S. Cl. ................. 236/100; 236/101 C; 236/99 K
(58) Field of Classification Search ................. 236/34, 236/34.5, 101 C, 99 K, 95; 251/11; 60/527
See application file for complete search history.

(56) References Cited

U.S. PATENT DOCUMENTS 3,719,085 A * 3/1973 Sliger ......................... 60/527
5,033,865 A * 7/1991 Kuze .......................... 236/34.5
5,381,951 A * 1/1995 Michel ....................... 236/34.5
6,142,183 A * 11/2000 Karthaeuser ............. 137/627.5

FOREIGN PATENT DOCUMENTS

| JP | 55729/1980 | 4/1980 |
|----|-----------|--------|
| JP | 07-098390 | 4/1995 |
| JP | 10-68473  | 3/1998 |
| JP | 3225386   | 8/2001 |

\* cited by examiner

Primary Examiner—Chen Wen Jiang
(74) Attorney, Agent, or Firm—Oblon, Spivak, McClelland, Maier & Neustadt, P.C.

(57) ABSTRACT

A thermal element of a simple structure which can have a reduced cost because a minimum required number of structural components are used, excels in response and endurance and enables forward and backward movement of a piston with the prescribed stroke under the effect of volume changes following the expansion and contraction of a thermally expandable body.

A thermal element 10 containing a thermally expandable body (wax 12) inside a case 11 comprises a piston 13 arranged inside the case along the axial line thereof. The inward end of the piston borders on the inside of the thermally expandable body and the outward end thereof protrudes outwardly from one end of the case, thereby enabling the piston to move forward and backward following the expansion and contraction of the thermally expandable body. The piston is slidably held with a guide member 14 disposed in a portion at one end inside the case. Furthermore, a sealing member 15 is disposed in a portion at the inward end of the guide member inside the case and seals the thermally expandable body at the other end inside the case.

14 Claims, 2 Drawing Sheets

THERMOELEMENT

TECHNICAL FIELD

The present invention relates to a thermal element suitable, for example for thermostats for actuating valves of fluid passages such as cooling water passages. More particularly, the present invention relates to a thermal element comprising a thermally expandable body which is expanded or contracted by temperature changes in a detection object such as cooling water, and a movable member (piston) which is moved by the thermally expandable body.

BACKGROUND ART

In cooling apparatuses of a cooling water type which are used to cool automobile engines, thermostats have been used as control valves for regulating the quantity of cooling water circulating in the radiator, thereby making it possible to control the temperature of cooling water introduced in the engine. A control valve in such thermostats is inserted into part of a cooling water passage constituting the cooling apparatus and the temperature of cooling water is controlled to the required level by closing the control valve and causing the cooling water to circulate via a bypass passage, without passing through the radiator, when the cooling water temperature is low, and opening the control valve and causing the cooling water to circulate via the radiator when the cooling water temperature is raised.

Thermal elements using a thermally expandable body such as wax have generally been used as temperature sensors in such thermostats.

Conventional thermostats of this kind are known to have a variety of structures, primarily of a sleeve type (see, for example, Japanese Examined Utility Model Application No. S58-16003) and a diaphragm type (see, for example, Japanese Patent No. 3225386, pages 2–3, FIG. 1, FIG. 6).

The thermal element of a sleeve type which is described in the aforementioned Japanese Examined Utility Model Application No. S58-16003 has a structure in which a rubber sleeve is accommodated inside a metal container, the sealed chamber formed between the container and the rubber sleeve is filled with a wax serving as a thermally expandable body, and a piston as a movable member is slidably inserted via a compressible flowable body into the rubber sleeve. Further, in such a sleeve-type thermal element, the piston is actuated forward and backward by causing the piston to protrude by squeezing out the piston with the rubber sleeve provided around the piston.

On the other hand, the diaphragm-type thermal element described in the aforementioned Japanese Patent No. 3225386 has a structure in which a wax as a thermally expandable body is sealed at one end side of a case and volume changes of the wax are transferred by a diaphragm or flowable body to a piston serving as a movable body. In the thermal elements of a diaphragm type, if the wax expands, the diaphragm deforms so as to bulge in the direction from the wax, thereby applying pressure to the flowable body. As a result, this thermal expansion is converted into an axial movement and the piston serving as the movable body protrudes to the outside of the case.

The Japanese Patent No. 3225386 discloses as prior art technology a structure in which a rubber piston is used as a sealing material for preventing the flowable body from leaking to the piston side, the rubber piston provides for sealing, while sliding, and a back-up plate formed from a fluororesin is provided between the rubber piston and piston in order to prevent the rubber piston and piston from being fixedly attached to each other.

Further, Japanese Patent No. 3225386 also disclosed a structure in which the aforementioned rubber piston is omitted, the inward end of the piston borders on the inside of the flowable body, a ring-like sealing member is provided by inserting between the piston and case, and the flowable body is prevented from leaking to the outside.

Among the thermal elements having the above-described structure, the following problem was associated with the sleeve-type thermal element described in Japanese Examined Utility Model Application No. S58-16003. Thus, if the fluid which was the object of detection, such as cooling water, permeated into the container, the piston could not return into the container, and the so-called lift-up state was assumed. Further, when such a thermal element was used in a thermostat, the problem was that the warm-up performance of the engine could degrade because the valve remained open in the fluid channel.

Further, such sleeve-type thermal elements had a structure in which the piston was caused to protruded by squeezing out the sleeve. For this reason, a problem was associated with response. Another problem was that a long piston stroke could not be obtained. Furthermore, because normally the above-described sleeve repeatedly contracted and expanded, it could easily be fractured due to degradation, and once it has been fractured, the piston could not be caused to protrude. When such a thermal element was used in a thermostat, the valve remained in a closed state. Therefore, there was a risk of overheating, and special measures had to be taken to prevent it.

Furthermore, in the thermal element of a diaphragm type which represented prior art technology, by contrast with the above-described sleeve-type configuration, the wax that was a thermally expandable body was completely separated by the diaphragm. Therefore, no problem was associated with wax leakage. However, instead the problem was associated with the increased number of structural components because a diaphragm for separating the wax and transferring the expansion, a flowable body for pushing the piston instead of the conventional wax, and a rubber piston for sealing the flowable body had to be used, and the cost was difficult to reduce. Moreover, because wax was employed as a separate structure, a flowable body with flowability and lubricating properties better than those of the wax had to be used instead of the wax as a medium for moving the piston.

Further, in the above-described diaphragm-type thermal element, both the piston and the guide member holding the piston were made from a metal. Therefore, when a reaction force from another side was applied to the piston or guide member, the piston was tilted, the sliding resistance increased, and a problem was associated with the wear of the piston and guide member. Moreover, if the substances contained in the cooling water underwent chemical changes and were deposited as foreign matter on the sliding portions of the piston and guide member, the piston sometimes either moved slowly or could not move at all and maintenance was often required.

Further, the rubber piston that was a sealing member had a substantially round columnar shape and sealed, while sliding integrally with the piston. Therefore, the sliding resistance was large, resulting in poor response. Another problem was that in terms of endurance, the sealing performance was insufficient. Yet another problem was that because a diaphragm was used, the amplitude of this diaphragm was limited, thereby making it impossible to increase the operating stroke of the piston.

For this reason, as described in Japanese Patent No. 3225386, a structure was used in which the piston was caused to border on the inside of the flowable body and a sealing member was provided between the flowable body and guide member to prevent the flowable body from flowing out to the outside of the case and the cooling water from penetrating into the case. However, a large number of structural components such as the diaphragm and flowable body were still required and cost was difficult to reduce.

Further, in Japanese Patent No. 3225386, the aforementioned flowable body was sealed with a simple U-shaped packing between the piston and guide member, but the problem associated with this packing was that it created a risk of the flowable body leaking to the outside.

With the foregoing in view, it is an object of the present invention to obtain a thermal element with excellent response and endurance, in which the problems inherent to the above-described sleeve-type or diaphragm-type thermal elements are resolved, the cost can be reduced with a minimum necessary number of structural components, and the forward-backward movement of the piston with the prescribed stroke can be obtained by means of volume changes accompanying the expansion and contraction of a thermally expandable body.

DISCLOSURE OF THE INVENTION

In order to attain this object, one embodiment according to the present invention provides a thermal element in which a thermally expandable body capable of expanding as the temperature rises and contracting as the temperature decreases is contained inside a case so that this body can be thermally affected from the outside of the case, this thermal element comprising a piston which moves forward and backward following the expansion and contraction of the thermally expandable body because the piston is disposed along the axial direction inside the case, the inward end thereof borders on the inside of the thermally expandable body, and the outward end thereof protrudes to the outside from one end of the case, a guide member disposed in the portion at one end inside the case and slidably holding the piston, and a sealing member disposed in the portion at the inward end of the guide member inside the case and sealing the thermally expandable body at the other end inside the case, wherein the case is formed as a hollow container having a shape of a substantially closed-end tube that has an opening for fitting the guide member and has a closed-end portion with the inner peripheral surface of a spherical shape formed in the end portion at the side opposite the opening, the guide member has a through hole on an axial line and an outer peripheral portion thereof is molded from a resin to imitate the inner peripheral shape of the case, and the sealing member is inserted and provided between the inward end of the guide member and the thermally expandable body inside the case.

Another embodiment according to the present invention provides a thermal element in which the case is a hollow container composed of a large-diameter tubular portion having an opening for fitting the guide member and a closed-end small-diameter tubular portion coaxially linked to the large-diameter tubular portion and having a diameter less than that of the large-diameter tubular portion, a step is formed between those small-diameter tubular portion and large-diameter tubular portion, the guide member is composed of a base portion and a seat portion coaxially linked thereto and is molded from a resin to assume a round columnar shape having a through hole on the axial line, the base portion is formed to imitate the inner peripheral shape of the large-diameter tubular portion of the case and is disposed by locking with the step inside the large-diameter tubular portion of the case, and the seat portion is formed to imitate the inner peripheral shape of the small-diameter tubular portion of the case and is composed so that the inward end thereof holds the sealing member for sealing the thermally expandable body filled inside the small-diameter tubular portion of the case, in a state of being controlled from the side opposite the thermally expandable body.

Another embodiment according to the present invention provides a thermal element in which the case is a closed-end tubular container having a substantially uniform diameter and has a configuration such that the closed-end portion side of the inside the case is filled with the thermally expandable body and the guide member having the inward end thereof bordering on the thermally expandable body via a sealing member is fit from the opening of the case, and the guide member is provided inside the case and positioned therein with a locking tubular member fixed by fitting into the portion close to the opening of the case.

Another embodiment according to the present invention provides a thermal element in which the thermally expandable body is obtained by mixing a wax and a thermoplastic elastomer and then gelling by admixing a copper powder.

Another embodiment according to the present invention provides a thermal element in which the outer diameter of the piston is equal to or somewhat less than the diameter of the through hole of the guide member and is larger than the inner diameter of the lip of the sealing member, the piston passes through the through hole of the guide member and sealing member and is disposed so that the inward end thereof borders on the inside the thermally expandable body filled in the closed-end portion of the case, and the outward end thereof is disposed so as to protrude from the guide member, and the piston has a configuration such as to move forward and backward following expansion and contraction of the thermally expandable body.

Another embodiment according to the present invention provides a thermal element in which the sealing member is formed as a round ring-like member having a cross-section of a substantially U-like shape and is formed so that the axial hole thereof has a diameter less than the shaft diameter of the piston, one end thereof abuts on the inward end of the guide member, the recess produced by the U-like shape at the other end is disposed to border on the thermally expandable body, the outer peripheral portion of the sealing member comprises a fixed-side lip formed on the outer peripheral side of the recess and a second fixed-side lip formed at the prescribed distance therefrom in the axial direction, those fixed-side lips are formed to have the same outer diameter, and the second fixed-side lip is formed to have a straight shape of a prescribed length in the axial direction, the inner peripheral portion of the sealing member comprises a sliding-side lip formed on the inner peripheral side of the recess and a second sliding-side lip formed at the prescribed distance therefrom in the axial direction, and those two sliding-side lips are formed to have different inner diameters, and the fixed-side lips and the sliding-side lips formed on both sides in the radial direction of the recess are formed so as to spread at the inner peripheral surface side of the case and the outer peripheral surface side of the piston under the effect of the pressure generated by thermal expansion of the thermally expandable body, thereby increasing the sealing force of the piston.

In accordance with the present invention, because the inward end of the piston directly borders on the inside of the wax serving as a thermally expandable body inside the case, for example, if the wax is warmed by rising temperature, the wax is melted, the volume thereof changes, and the piston is pushed in the direction of protruding from the case and guide member by those volume changes, that is, by the expansion. Here, providing the inner peripheral surface of the closed-end portion of the case with a spherical shape makes it possible to avoid the concentration of stresses accompanying the expansion of the thermally expandable body into the case and apply uniformly the pressure generated by the expansion of the thermally expandable body to the inward end of the piston.

Because in the sealing member, the pressure created by the wax is applied to the recess located between the inner and outer lips, the lips spread to the inside and outside and sealing force between the piston and the inner peripheral portion of the case is increased.

Moreover, because two places, that is, the aforementioned sliding-side lip and another sliding-side lip with a larger diameter are in sliding contact with the piston in the inner peripheral portion of the sealing member, sealing can be conducted without increasing the sliding resistance. Therefore, good response is obtained when the piston moves.

Furthermore, if the temperature drops, the wax returns to a solid state and the volume thereof decreases. Therefore, the piston is pulled into the case and returned to its original state (for example, with a return spring which is not shown in the figures).

Because the sealing member is not affected by the wax, the sealing force of the lip-shaped portions becomes less than that during expansion, thereby facilitating the return of the piston.

Furthermore, because of the structure in which the expansion of the thermally expandable body is directly transferred to the piston, the stroke can be increased in length by comparison with thermal elements of conventional structures using diaphragms or rubber sleeves.

Further, because of the structure in which the piston is directly caused to move without using the above-mentioned conventional rubber members such as rubber sleeves or diaphragms, excellent response is obtained. Furthermore, because parts that can easily deteriorate, such as rubber parts, are not present in sliding and holding portions created by the piston, the guide member which slidably holds the piston, and the member (thermally expandable body) for moving the piston forward and backward, the structure also excels in endurance.

Here, a composition that was gelled by admixing a copper powder to a mixture of wax and a thermoplastic elastomers may be used as the aforementioned thermally expandable body. Usually, the wax of this type is prepared by kneading a copper powder with the wax to improve reactivity, but in repeated use, the wax and copper powder are separated. If then the copper penetrates between the guide and the piston, it scratches the sliding surface, which can result in the permeation of cooling water from the outside or the outflow of the wax sealed inside. The aforementioned gelling effectively resolves this problem.

BEST MODE FOR CARRYING OUT THE INVENTION

Figure 1:
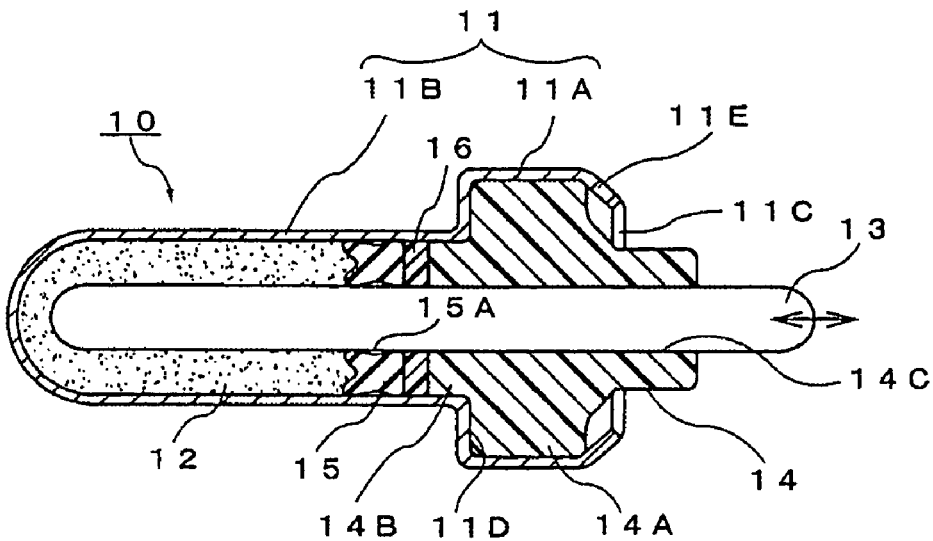
FIG. 1 is a schematic cross-sectional view showing the first embodiment of the thermal element in accordance with the present invention.
Figure 2:
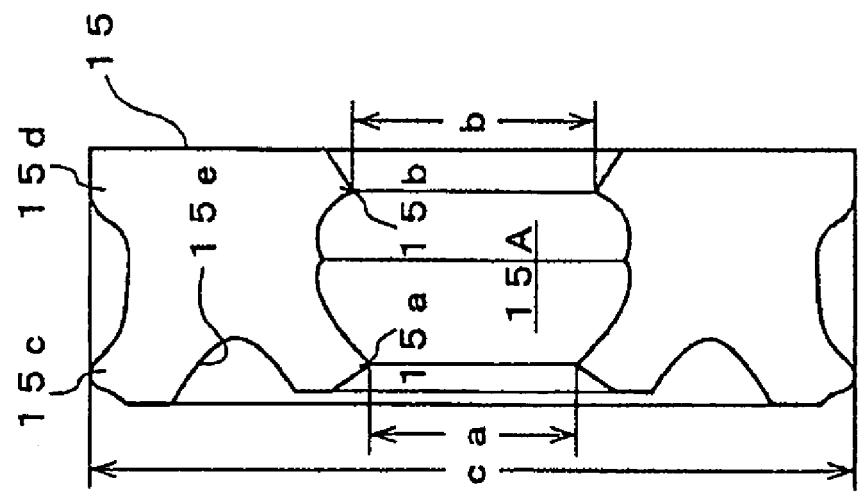
FIG. 2 is an exploded view of the main portion employed for explaining the sealing member used in the thermal element in accordance with the present invention.
Figure 3:
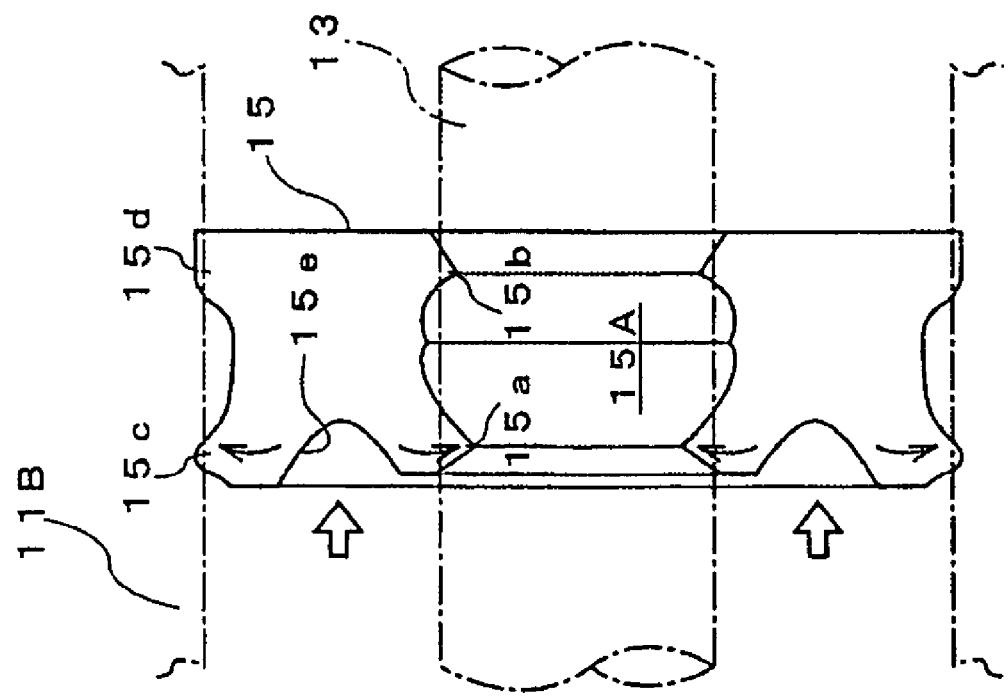
FIG. 3 illustrates in greater detail the sealing member shown in FIG. 2.

FIGS. 1 to 3 illustrate the first embodiment of the thermal element in accordance with the present invention.

A thermal element denoted in those figures with the reference numeral 10 will be explained hereinbelow with reference to FIG. 1. Thus, the reference numeral 11 stands for a metal case constituting the thermal element body. Wax 12 serving as a thermally expandable body which thermally expands and shrinks under the effect of heat from the outside of the case 11 is sealed inside the case 11. The case 11 may be formed by press forming from any material capable of adequately transferring heat from the outside.

The reference numeral 13 stands for a piston disposed along the axial direction inside the case 11. Because the inward end of the piston 13 borders on the inside of the wax 12 and the outward end of the piston protrudes outwardly from one end of the case 11, the piston can move forward and backward along the axis, following the expansion and contraction of the wax. The operation of retracting the piston 13 into the case 11 is carried out by an impelling force, for example, of a return spring provided at the outside.

The reference numeral 14 stands for a guide member made from a resin for slidably holding the piston 13. The guide member is disposed in the portion at one end inside the case 11.

The reference numeral 15 stands for a sealing member disposed in the portion at the inward end of the guide member 14 inside the case 11 for sealing the wax 12 at the other end inside the case 11.

The reference numeral 16 stands for a back-up plate formed from a fluororesin or the like and provided between the sealing member 15 and the inward end of the guide member 14. The back-up plate 16 is provided optionally and may be omitted. It goes without saying, that with the configuration in which the back-up plate 16 is used and the piston 13 can be supported also by the inner hole surface thereof, a sufficient length of the sliding support portion of the piston 13 can be ensured, thereby making contribution to the miniaturization of the entire thermal element 10 in the axial direction.

Here, the case 11 is a hollow container composed of a large-diameter tubular portion 11A and a small-diameter tubular portion 11B. Those large-diameter tubular portion 11A and small-diameter tubular portion 11B are coaxially connected to each other, and one end of the large-diameter tubular portion 11A is formed as an opening 11C.

The small-diameter tubular portion 11B has a closed-end hollow structure with a diameter reduced with respect to that of the large-diameter tubular portion 11A. Furthermore, the large-diameter tubular portion 11A has a hollow structure with an opening 11C for inserting the guide member 14, and a step 11D for controlling the movement of the guide member 14 into the wax 12 is formed between those small-diameter tubular portion 11B and large-diameter tubular portion 11A.

Further, the reference symbol 11E in the figure stands for a caulked portion for locking the guide member 14 after it has been fitted into the large-diameter tubular portion 11A. Furthermore, the inner surface of the closed-end portion of the small-diameter tubular portion 11B is formed so as to have a spherical shape, thereby enabling the pressure of the wax 12 which is a thermally expandable body to be uniformly applied to the inward end of the piston 13.

Further, the guide member 14 is composed of a base portion 14A and a seat portion 14B, has a round columnar shape with a through hole 14C along the axial line, and is formed, for example, from polytetrafluoroethylene which is a fluoropolymer material. Here, the base portion 14A is formed to imitate the inner peripheral shape of the large-diameter tubular portion 11A of the case and is disposed so as to be locked with the step 11D between the small-diameter tubular portion 11B and large-diameter tubular portion 11A of the case. The seat portion 14B is formed to imitate the inner peripheral shape of the small-diameter tubular portion 11B of the case, and the configuration thereof is such that the inward end thereof is held in a state in which the sealing member 15 for sealing the wax 12 filled inside the small-diameter tubular portion 11B of the case is controlled from the side opposite to that of the wax.

Here, the wax 12 serving as the aforementioned thermally expandable body is capable of expanding following the increase in temperature and contracting following the decrease in temperature under the thermal effect from the outside of the case 11. A composition that was gelled by admixing a copper powder to a mixture of wax and a thermoplastic elastomers is used as the aforementioned wax. Usually, the wax of this type is prepared by kneading a copper powder with the wax to improve reactivity, but in repeated use, the wax and copper powder are separated and the copper can penetrate between the guide and the piston and scratch the sliding surface. The aforementioned gelling is employed to resolve this problem.

Further, the outer diameter of the piston 13 is equal to or somewhat less than that of the through hole 14C of the guide member 14 and is larger than the inner diameters (a), (b) of the lips 15a, 15b of the sealing member 15. The piston 13 is disposed so that it passes through the through holes 14C, 15A of the guide member 14 and sealing member 15, the inward end thereof borders on the inside of the wax 12 that was inserted in the small-diameter tubular portion 11B of the case, and the outward end thereof protrudes from the guide member 14 toward the outside of the case 11. This piston 13 moves forward and backward in the left-right direction, as shown in FIG. 1, following the expansion and contraction of the wax 12.

Here, the sealing member 15 is formed from a material having a sealing function, such as a rubber or synthetic resin, so as to assume the shape of a substantially round ring having the aforementioned through hole 15A and is disposed in the tubular portion of the case 11 in a state fitting together with the outer peripheral portion of the piston 13. This sealing member 15 at one end thereof abuts (abuts via the back-up plate 16, but the explanation of the back-up plate 16 is herein omitted) on the inward end of the guide member 14, as shown in FIGS. 1 to 3, and is formed so that the diameter of the through hole 15A is less than the shaft diameter of the piston 13 and is also formed so as to increase the sealing force of the piston 13 by spreading to the side of the case 11 and piston 13 under the pressure generated by thermal expansion of the wax 12.

Thus, the sealing member 15 is a member of a round ring-like shape with a substantially U-like cross section, and the recess 15e created by this U-like shape is arranged so as to border on the side of the wax 12. Further, the sealing member 15 is formed so that the outer diameters (c) of the fixed-side lips 15c, 15d formed on the outer periphery thereof are equal to each other, and among those fixed-side lips, the second fixed-side lip 15d which is located at the side of the guide member 14 has a straight shape of a predetermined length in the axial direction.

This straight lip 15d is a portion provided to prevent a tumbling effect that can be caused by the movement of the piston 13 or the operation force caused by thermal expansion of the wax 12 when the sealing member 15 is disposed between the case 11 and the piston 13 inside the piston. Because the wax 12 expands nonuniformly, the sealing member with the conventional shape is inclined causing the inclination of the piston and biting thereof into the guide member, or similar problems. The above-described configuration is employed to overcome this drawback.

Furthermore, another advantage of providing the aforementioned straight lip 15d is that when the guide member 14 is assembled by locking with the step 11d of the case 11, as described hereinabove, positioning of the sealing member 15 becomes possible and, therefore, the correct amount of wax 12 can be obtained.

Further, the sealing member 15 comprises sliding-side lips 15a, 15b in at least two places on the inner periphery. Those sliding-side lips 15a, 15b provided in two places are formed so as to have different inner diameters (a), (b) and are composed so as to provide adequate sealing with the piston 13 in the prescribed state. In particular, those sliding-side lips 15a, 15b abut on the outer peripheral portions of the piston 13 after it has been pushed therethrough and brought into contact therewith and seal those peripheral portions. Furthermore, because they have a two-step configuration with different inner diameters, the sliding resistance between them and the piston 13 is small and a sealing function is realized, this function preventing the leakage of the wax. Of those sliding-side lips 15a, 15b, the inner diameter (a) of the sliding-side lip 15a at the side of the wax 12, which is created by the recess 15e, is set larger that the inner diameter (b) of the second sliding-side lip 15b at the side of the guide member 14.

With such a sealing member 15, when the recess 15e formed in the portion bordering on the side of the wax 12 receives the pressure created by volume changes induced by thermal expansion of the wax 12, the deformation such as spread on the inner and outer periphery, like that shown by arrows in FIG. 3, is provided to the sliding-side lip 15a and fixed-side lip 15c. As a result, the sealing function can be enhanced.

With such a configuration, because the inward end of the piston 13 borders on the inside of the wax 12 serving as a thermally expandable body inside the case 11, for example, if the wax 12 is warmed by temperature increase, the wax 12 will melt and the volume thereof will change. As a result of this volume change, that is, expansion, the piston 13 is pushed out from the case 11 and guide member 14 in the direction of protruding. At this time, because the pressure of the wax 12 is applied to the recess 15e located between the inner and outer lips 15a, 15c of the sealing member 14, the lips 15a, 15c spread to the inside and outside and the sealing force between the outer peripheral portion of the piston 13 and the inner peripheral portion of the case 11 is increased.

Moreover, because the portions sliding over the piston 13 on the inner peripheral side of the sealing member 15 are the above-described sliding-side lip 15b and sliding-side lip 15a which is larger in diameter than the lip 15b, sealing can be provided without increasing the sliding resistance. Therefore, the response during movement of the piston 13 is good.

Further, if the temperature drops, the wax 12 returns to a solid state and the volume thereof is decreased. As a result the piston 13 is pulled into the case 11 and returns to the original state (for example, under the effect of a return spring provided on the outside of the case 11; the spring is not shown in the figures). At this time, because the sealing member 15 is not affected by the wax 12, the lip-shaped portions demonstrate a sealing force less than that during expansion. Therefore, the piston 13 easily returns to the original state.

With such a structure, the expansion of wax 12 is directly transferred to the piston 13. Therefore, the movement stroke can be increased with respect to that of the thermal elements with the conventional structure using a diaphragm or a rubber sleeve.

Further, because of the structure in which the piston 13 is directly caused to move without using the above-mentioned conventional rubber members such as rubber sleeves or diaphragms, excellent response is obtained. Furthermore, because parts that can easily deteriorate, such as rubber parts, are not present in sliding and holding portions created by the piston 13, the guide member 14 which slidably holds the piston, and the member (wax 12) for moving the piston 13 forward and backward, the structure also excels in endurance.

Figure 4:
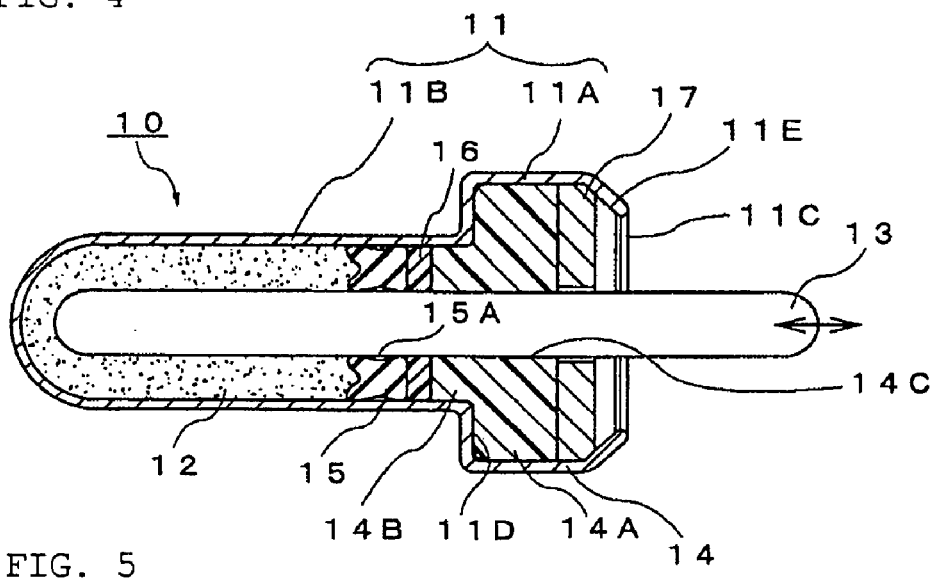
FIG. 4 is a schematic cross-sectional view showing the second embodiment of the thermal element in accordance with the present invention.

The second embodiment which is the modification of the above-described first embodiment is shown in FIG. 4.

In the present embodiment, a metal plate 17 is inserted at the outward end side of the base 14A of the guide member 14 fit from the opening 11C inside the large-diameter tubular portion 11A of the case, and this metal plate is fixed by a caulked portion 11E. In such a case, the guide member 14 can be reliably fixed to the case 11. Furthermore, because the exposure of the guide member 14, which is a resin molding, to the outside is reduced, functions suitable for high-temperature and high-pressure specifications can be obtained.

Figure 5:
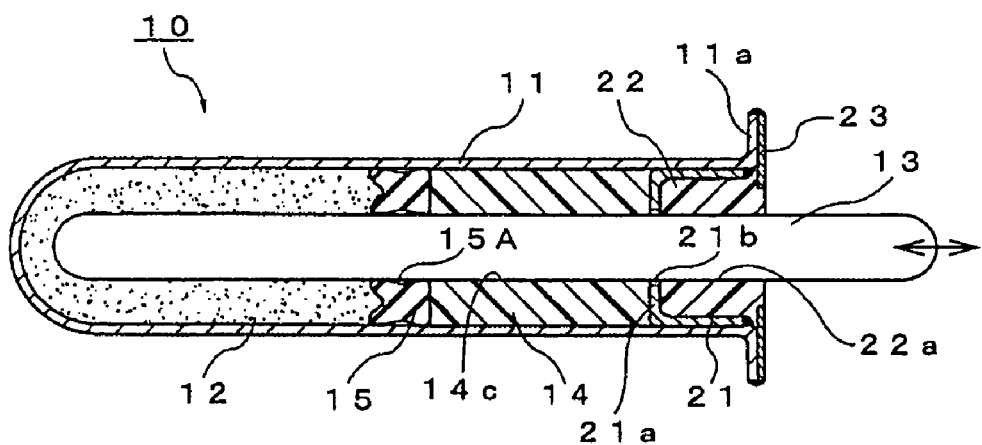
FIG. 5 is a schematic cross-sectional view showing the third embodiment of the thermal element in accordance with the present invention.

FIG. 5 illustrates the third embodiment of the thermal element in accordance with the present invention.

In the figure, the thermal element denoted by the reference numeral 20 comprises a metal case 11 composed of a closed-end tubular hollow container having a substantially uniform diameter, and a wax 12 as a thermally expandable body that can be thermally expanded and contracted under the thermal effect from the outside of the case 11 is sealed in the closed-end portion of the case.

A piston 13 is disposed along the axial direction inside the case 11, the inward end of the piston borders on the inside of the wax 12 and the outward end thereof protrudes outwardly from the opening of the case 11, such a configuration allowing the piston to move forward and backward along the axial line, following the expansion or contraction of the wax 12. The operation of retracting the piston 13 into the case 11 is carried out by an impelling force, for example, of a return spring provided at the outside, similarly to the above-described embodiment.

In the figure, the reference numeral 14 denotes a guide member preferably formed from a resin material for slidably holding the piston 13. In the present embodiment, the guide member is formed so as to have a substantially cylindrical shape. The guide member is inserted into the case 11 by fitting from one end side (opening side) thereof and plays the role of slidably holding the piston 13.

A sealing member 15 is inserted and disposed on the inward end side of the guide member 14 inside the case 11 for sealing the wax 12 in the closed-end portion inside the case 11. The reference symbol 14c in the figure stands for a through hole for slidably holding the piston 13.

Furthermore, in the present embodiment, the sealing member 15 directly abuts on the inward end of the guide member 14, but it goes without saying that a back-up plate formed, for example, from a fluororesin may be incorporated therebetween similarly to the above-described embodiment.

Moreover, in the present embodiment, a sealing member identical that explained in the above-described embodiment is used as the sealing member 15, and specific explanation thereof is herein omitted.

In such a configuration, a locking tubular body 21 having a substantially inward cap-like shape and a guide tubular body 22 formed preferably from a rubber material and provided integrally at the outward end side of the locking tubular body 21 are provided as locking tubular members that are fit and fixed so as to border on the outward end of the guide member 14 inside the case 11 close to the opening thereof. The guide tubular body 22 is fixed to the case 11 after being fit, together with the locking tubular body 21, in the vicinity of the opening of the case 11 with a push plate 23. This guide tubular body serves as a second guide member for preventing the cooling water from penetrating from the outside and for slidably holding the piston 13.

Furthermore, the aforementioned locking tubular member 21 is fitted into the opening of the case 11 and fixedly attached, for example, by welding to the case 11, after the wax 12, sealing member 15, and guide member 14 have been assembled in the order of description inside the case 11. Here, the locking position of this locking tubular body 21 can be adjusted and fixed in a state allowing the adjustment of the assembly position (internal installation position) of the guide member 14 inside the case 11. Further, the reference symbol 21a in the figure denotes a closed-end portion of the locking tubular body 21 which locks the guide member 14, [and the reference symbol 21b denotes] an opening for loosely holding the piston 13 so that it is free to slide. Further, the reference symbol 22a stands for an axial hole for slidably supporting the piston 13 inside the guide tubular body 22.

Thus, the configuration of the present embodiment allows for any positional setting of the inward end of the guide member 14 for sealing the wax 12 via the sealing member 15 after the wax has been introduced into the case 11. With such a configuration, the process of adjusting the volume of wax 12, which is a thermally expandable body inserted into the case 11, as a post-processing step that has been implemented when the conventional elements were assembled becomes unnecessary, and because this adjustment can be carried out by adjusting the fixing position of the locking tubular body 21 when assembling, this configuration excels in operability.

Adding for form's sake, usually when the initial setting of temperature—lift relation was carried out in wax-type elements, for example, a piston lift of 10 mm was set for a temperature of 80° C., but because this lift was determined by the amount of waxed sealed, it was necessary to introduce somewhat less wax when assembling and to indent part of the case during the adjustment. By contrast, in the present embodiment, assembling may be conducted while adjusting the installation position of the locking tubular member 21.

With such a configuration, too, similarly to the above-described embodiment, the problems associated with the conventional sleeve-type or diaphragm-type thermal elements can be resolved and a thermal element with excellent response and endurance can be obtained with a minimum necessary number of structural components and at a reduced cost, wherein the forward and backward movement of the piston through the prescribed stroke can be obtained by means of volume changes accompanying the expansion and contraction of a thermally expandable body. Yet another advantage of the present embodiment, is that the shape and structure of the case 11 and guide member 14 are further simplified, thereby further improving processability and assembling efficiency and reducing cost.

The present invention is not limited to the structures explained in the above-described embodiments, and it goes without saying that the shape and structure of components can be appropriately changed and modified. For example, the shape and structure of the case 11 obviously can be appropriately changed, and appropriate modification examples with structures in which the guide member 14 and also the sealing member 15 are assembled with such case 11 can be considered.

Further, the shape of the sealing member 15 is not limited to that shown in FIG. 2 and FIG. 3, and any shape and configuration that have a similar function may be employed.

INDUSTRIAL APPLICABILITY

As described hereinabove, the thermal element in accordance with the present invention demonstrates the following effects. Thus, the problems inherent to the sleeve-type or diaphragm-type thermal elements, which are the conventional structures, are resolved, the cost can be reduced with a minimum necessary number of structural components, forward-backward movement of the piston through the prescribed stroke can be obtained by means of volume changes accompanying the expansion and contraction of a thermally expandable body, and a thermal element with excellent response and endurance can be obtained.

In particular, because the present invention provides a structure in which the expansion of the thermally expandable body is directly transferred to the piston, the movement stroke can be increased by comparison with that of the conventional thermal elements using diaphragms or rubber sleeves, and functionality of the thermal element can be improved.

Further, because the present invention provides a structure in which the piston is directly caused to move without using the above-mentioned conventional rubber members such as rubber sleeves or diaphragms, excellent response is obtained. Furthermore, because parts that can easily deteriorate, are not present, the structure also excels in endurance.

The invention claimed is:

1. A thermal element comprising:
a case having a thermally expandable body capable of expanding as a temperature rises and contracting as the temperature decreases inside the case;
a piston which moves forward and backward following the expansion and contraction of the thermally expandable body and which is disposed inside said case along an axial line of said case, said piston having an inward end in said thermally expandable body, and an outward end protruding to the outside from one end of the case;
a guide member disposed at least partially inside said case and slidably holding said piston; and
a sealing member disposed adjacent to the guide member inside said case and sealing said thermally expandable body inside the case,
wherein said case is formed as a hollow container having a shape of a substantially closed-end tube that has an opening for fitting said guide member and has a closed-end portion with an inner peripheral surface of a spherical shape formed in an end portion on an opposite side of the opening, said guide member has a through hole on the axial line and an outer peripheral portion thereof is molded from a resin to imitate an inner peripheral shape of said case, said sealing member is inserted and provided between said guide member and said thermally expandable body inside said case, and said thermally expandable body is obtained by mixing a wax and a thermoplastic elastomer and then gelling by admixing a copper powder.

2. The thermal element according to claim 1, wherein:
said case is a hollow container having a large-diameter tubular portion having an opening for fitting said guide member and a closed-end small-diameter tubular portion coaxially linked to the large-diameter tubular portion and having a diameter less than a diameter of said large-diameter tubular portion, and a step is formed between the small-diameter tubular portion and large-diameter tubular portion;
said guide member has a base portion and a seat portion coaxially linked thereto and is molded from a resin to assume a round columnar shape having a through hole on the axial line;
said base portion is formed to imitate an inner peripheral shape of said large-diameter tubular portion of the case, and is disposed by locking with said step inside said large-diameter tubular portion of the case; and
said seat portion is formed to imitate an inner peripheral shape of said small-diameter tubular portion of the case and holds said sealing member for sealing the thermally expandable body filled inside said small-diameter tubular portion of the case.

3. The thermal element according to claim 1, wherein:
said case is a closed-end tubular container having a substantially uniform diameter, and that the closed-end portion is filled with the thermally expandable body and the guide member is fitted from the opening of said case; and
the guide member is provided inside said case and positioned therein with a locking tubular member fixed by fitting from the opening of said case.

4. The thermal element according to claim 1, wherein:
said guide member and sealing member have a though hole;
said piston has an outer diameter which is equal to or less than a diameter of the through hole of said guide member and is larger than an inner diameter of a lip of said sealing member; and
said piston passes through the through hole of said guide member and sealing member.

5. The thermal element according to claim 1, wherein:
said sealing member is formed as a round ring-like member having a cross-section of a substantially U-like shape and has an axial hole which has a diameter less than a shaft diameter of said piston;
said sealing member has one end which abuts on the said guide member, and a recess bordering said thermally expandable body;
an outer peripheral portion of the sealing member comprises a fixed-side lip and a second fixed-side lip formed on an outer peripheral side of said recess along an axial direction of said case;
an inner peripheral portion of said sealing member comprises a sliding-side lip and a second sliding-side lip formed on an inner peripheral side of said recess along the axial direction of said case; and the fixed-side and second fixed-side lips and the sliding-side and second fixed-side lips are configured to spread at an inner peripheral surface of said case and an outer peripheral surface of said piston under pressure generated by thermal expansion of said thermally expandable body, thereby increasing sealing force of said piston.

6. A thermal element comprising:

a case having a closed-end tube shape with an opening and having a thermally expandable body therein, the thermally expandable body being capable of expanding as a temperature rises and contracting as the temperature decreases;

a piston having an inward end in direct contact with said thermally expandable body in said case and an outward end protruding outside from said case;

a guide member disposed inside said case and configured to slidably guide said piston along an axial line of said case; and a sealing member sealing said thermally expandable body inside said case and having a through hole configured to slidably hold said piston, wherein said case has a closed-end portion with a spherical shaped inner peripheral surface at an opposite end of said opening.

7. The thermal element according to claim 6, wherein:

said case has a large-diameter tubular portion having an opening for fitting said guide member and a closed-end small-diameter tubular portion coaxially linked to said large-diameter tubular portion, said closed-end small-diameter tubular portion has a diameter less than a diameter of said large-diameter tubular portion, and the case has a step portion formed between the small-diameter tubular portion and large-diameter tubular portion;

said guide member comprises a resin and has a base portion, a seat portion coaxially linked to said base portion and a through hole slidably holding said piston along the axial line of said case;

said base portion of said guide member is fitted to an inner peripheral shape of said large-diameter tubular portion of said case and is disposed by locking with said step inside said large-diameter tubular portion of said case; and said seat portion of said guide member is fitted to an inner peripheral shape of said small-diameter tubular portion of said case and holds said sealing member sealing said thermally expandable body inside said small-diameter tubular portion of said case.

8. The thermal element according to claim 6, further comprising a locking tubular member fitted in said case, wherein said case is a closed-end tubular container having a substantially uniform diameter, and said guide member is positioned in said casing with said locking tubular member fitted from said opening of said case.

9. The thermal element according to claim 6, wherein said thermally expandable body comprises a wax, a thermoplastic elastomer and a copper powder.

10. The thermal element according to claim 9, wherein said thermally expandable body comprises a gelled mixture of said wax, thermoplastic elastomer and copper powder.

11. The thermal element according to claim 6, wherein said sealing member has a lip portion defining an inner diameter which is smaller than an outer diameter of said piston, the lip portion of said sealing member slidably holding said piston.

12. The thermal element according to claim 6, wherein said sealing member is a round ring member having a recess portion bordering said thermally expandable body, said sealing member has a plurality of fixed-side lips and a plurality of sliding-side lips, said fixed-side lips are abutting against an inner surface of said case, said sliding-side lips are abutting against said piston, and said fixed-side lips and sliding-side lips include ones formed around said recess portion and configured to spread toward said inner surface of said case and said piston, respectively, under pressure generated by thermal expansion of said thermally expandable body.

13. The thermal element according to claim 6, further comprising a back-up plate interposed between said sealing member and said guide member, said back-up plate comprising a fluororesin.

14. A thermal element comprising:

a case having a closed-end tube shape with an opening and having a thermally expandable body therein, the thermally expandable body being capable of expanding as a temperature rises and contracting as the temperature decreases;

a piston having an inward end in direct contact with said thermally expandable body in said case and an outward end protruding outside from said case;

a guide member disposed inside said case and configured to slidably guide said piston along an axial line of said case; and sealing means for sealing said thermally expandable body inside said case, said sealing means having a through hole which slidably holds said piston, wherein said case has a closed-end portion with a spherical shaped inner peripheral surface at an opposite end of said opening.

* * * * *